United States Patent [19]

Michalski et al.

[11] 4,053,226

[45] Oct. 11, 1977

[54] PHOTOGRAPHIC PRINTER

[75] Inventors: Maksymilian A. Michalski, Woodside, N.Y.; Ellis Ashkenazi, Ridgewood, N.J.

[73] Assignee: Berkey Photo, Inc., Woodside, N.Y.

[21] Appl. No.: 664,425

[22] Filed: Mar. 8, 1976

Related U.S. Application Data

[63] Continuation of Ser. No. 504,708, Sept. 10, 1974, abandoned.

[51] Int. Cl.² .............................................. G01J 1/00
[52] U.S. Cl. .................................... 355/121; 355/83; 355/91
[58] Field of Search ..................... 355/78, 91, 93, 94, 355/113, 121, 83

[56] References Cited

U.S. PATENT DOCUMENTS 3,199,429  8/1965  Rice ...................................... 355/78
3,554,644  1/1971  Michalski ............................. 355/78

Primary Examiner—Richard L. Moses
Attorney, Agent, or Firm—Toren, McGeady and Stanger

[57] ABSTRACT

A printer for exposing photographic material is shown with a printing table horizontally mounted within a cabinet to receive photosensitive material and copy. A transparent plate is pivotably attached to hold the photosensitive material and copy in contact above the table which may be of the vacuum type. The front of the vacuum table may or may not exceed beyond the front of the cabinet. A fixed panel may be provided to support an exposing light above the table, additionally the control panel and shutter mechanism may be part of this fixed panel. A movable plate at least partially opaque to actinic rays may be moved inwardly as the transparent plate is raised. A safelight, viewing or inspection light may be mounted within the cabinet. A lifting and latching handle may be mounted at the front edge of the transparent plate.

16 Claims, 10 Drawing Figures

PHOTOGRAPHIC PRINTER

This is a continuation of application Ser. No. 504,708, filed Sept. 10, 1974 now abandoned.

BACKGROUND OF THE INVENTION

This invention relates to photographic printers and praticularly to printing apparatuses for use with exposing photosensitive material in contact with copy.

A printer of this type is disclosed in U.S. Pat. No. 3,554,644 of Maksymilian Michalski, assigned to the same assignee as the present invention. While such a printer has in the past been valuable, it has a number of disadvantages.

An object of the present invention is to overcome such disadvantages.

Various features of novelty which characterize the invention are pointed out with particularity in the claims forming a part of this specification. The invention furnishes a printer which is simple and effortless to operate. No tilting or flipping is required. It need merely be opened, loaded, closed, and exposed. One hand is all that is needed to operate the locking handle. Maximum accessibility is available for easy quick loading and accurate registration.

The light source is sensitivity matched. According to a feature of the invention the light source is positioned overhead at the optimum distance from the vacuum frame. This allows plates to be exposed with high resolution and even center to center dot production. It minimizes cleaning of reflectors and need for expensive exhaust systems.

According to the invention the vacuum printer is a completely self-contained table top device. It is suited for applications where space is restricted, but maximum production of plates and proofs are essential.

According to an aspect of the invention, the controls are are at eye level. A two-position rocker switch offers the operator the advantage of selecting either high or low light levels to match the speed of materials being used. A mode control switch selects either automatic or manual modes of operation.

According to another feature of the invention a window allowing an operator to inspect the operation rides up with a frame and rests horizontally above the work. The window forms a shield protecting the operator from ultraviolet light but permits inspection viewing with storage features. The window is also completely removable. The shuttered light source permits full and reduced light output operation. The exposure unit is combined with a light source and vacuum frame controls. The frame arrangement permits latching, control of the vacuum switch and counterbalanced operation. A new cooling arrangement for the light and the overall unit exists. Other objects and advantages of the invention will become evident from the following detailed description when read in light of the accompanying drawings wherein:

FIG. 1 is a perspective view of a printer embodying features of the invention.

FIG. 1' is an elevation of a detail illustrating a portion of the unit in FIG. 1.

FIG. 2' is an elevation of the control panel in FIG. 1.

Figure 5:
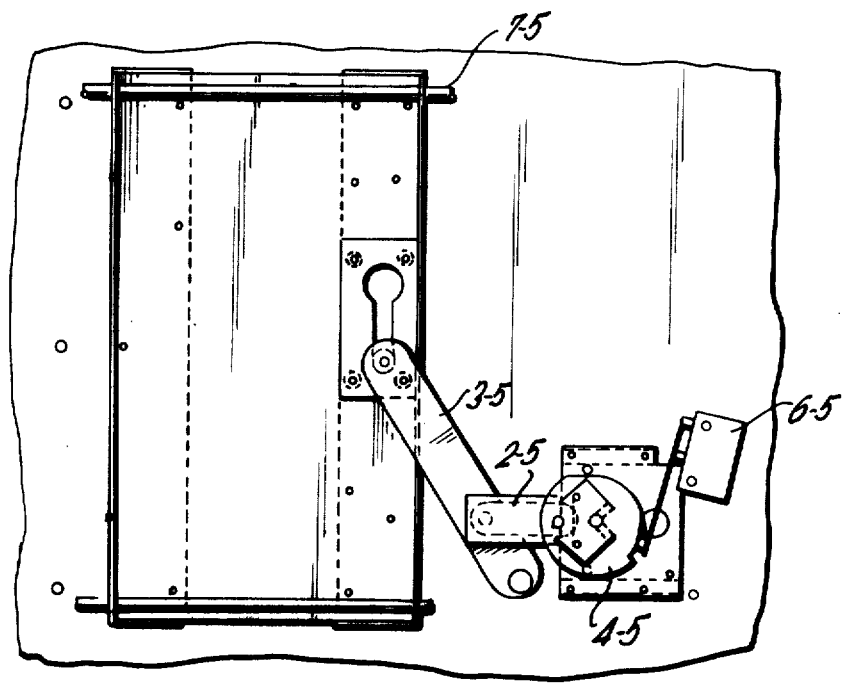
Figure 5:
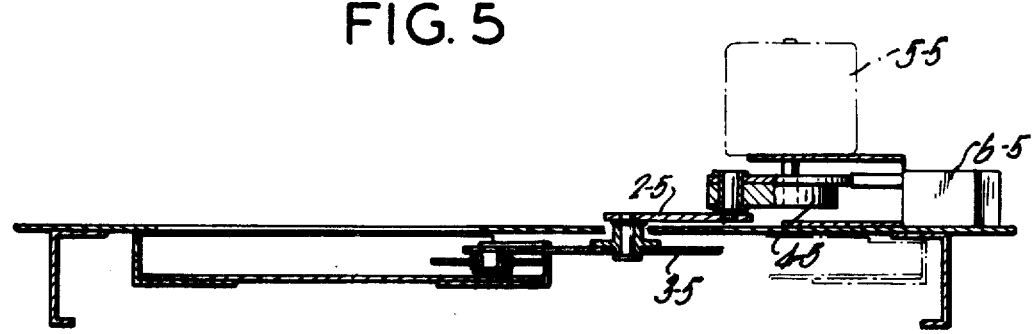

FIGS. 5 and 5' are views of the shutter arrangement.

Figure 6:
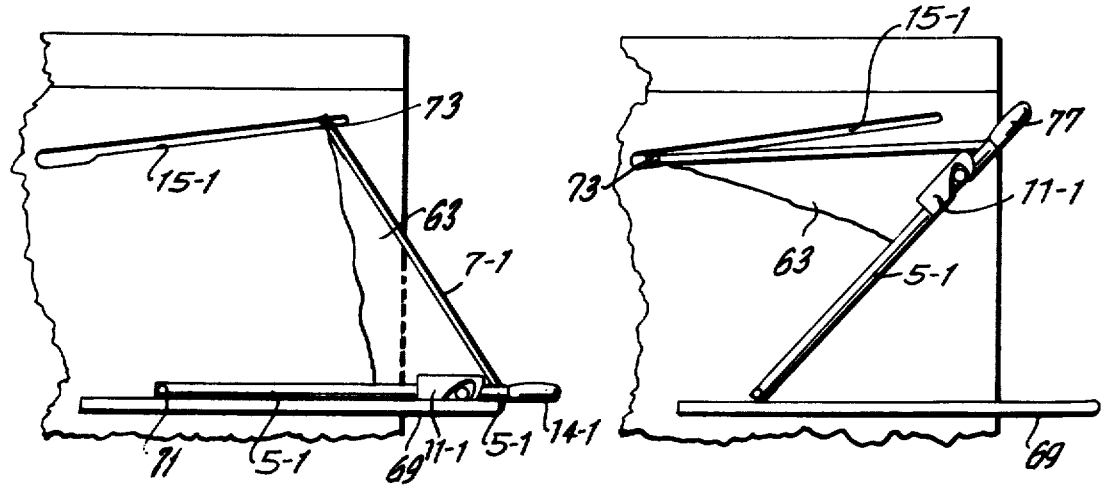

FIGS. 6 and 6' are sectional side elevations showing the movement of the viewing filter panel and the transparent plate.

DETAILED DESCRIPTION OF PREFERRED EMBODIMENTS

The printer shown in a 24 × 28 vacuum printer. It is a desk model using 220-250 volts 60 Hz.

Figure 1:
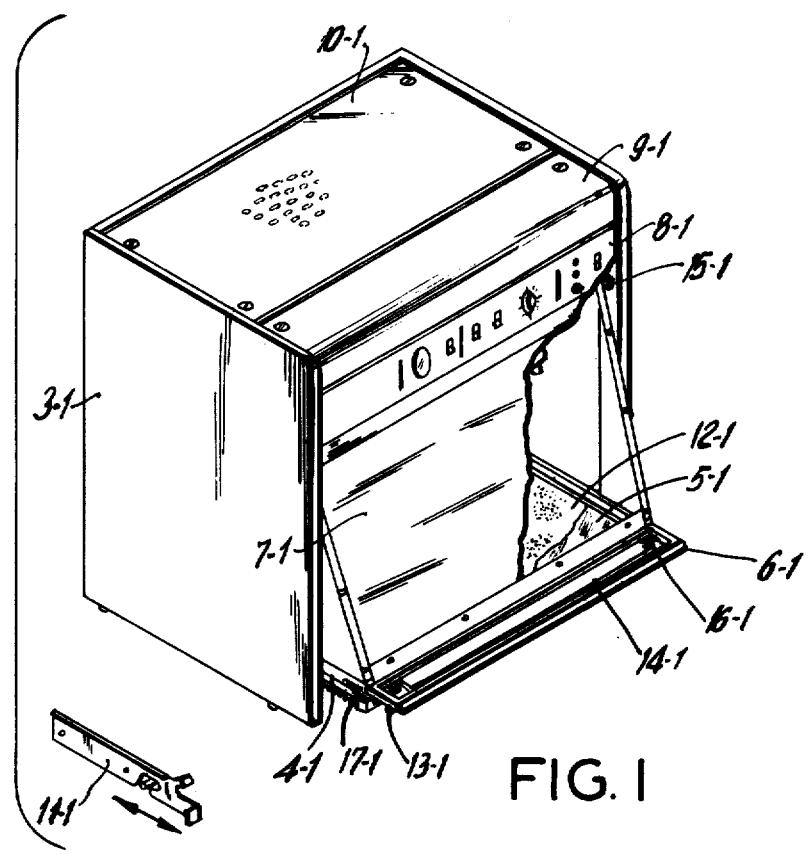
Figure 1:
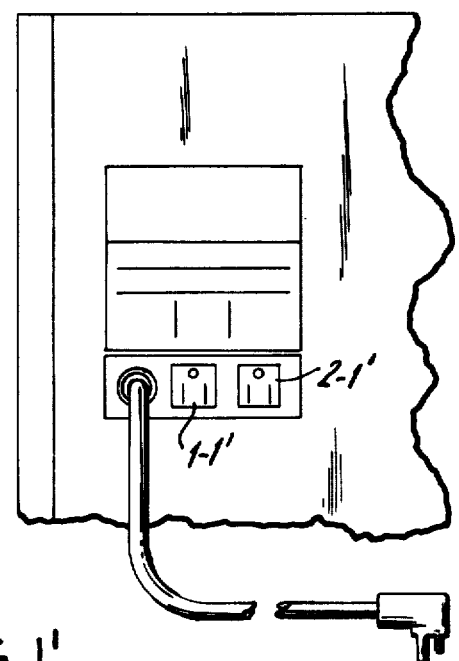
Figure 2:
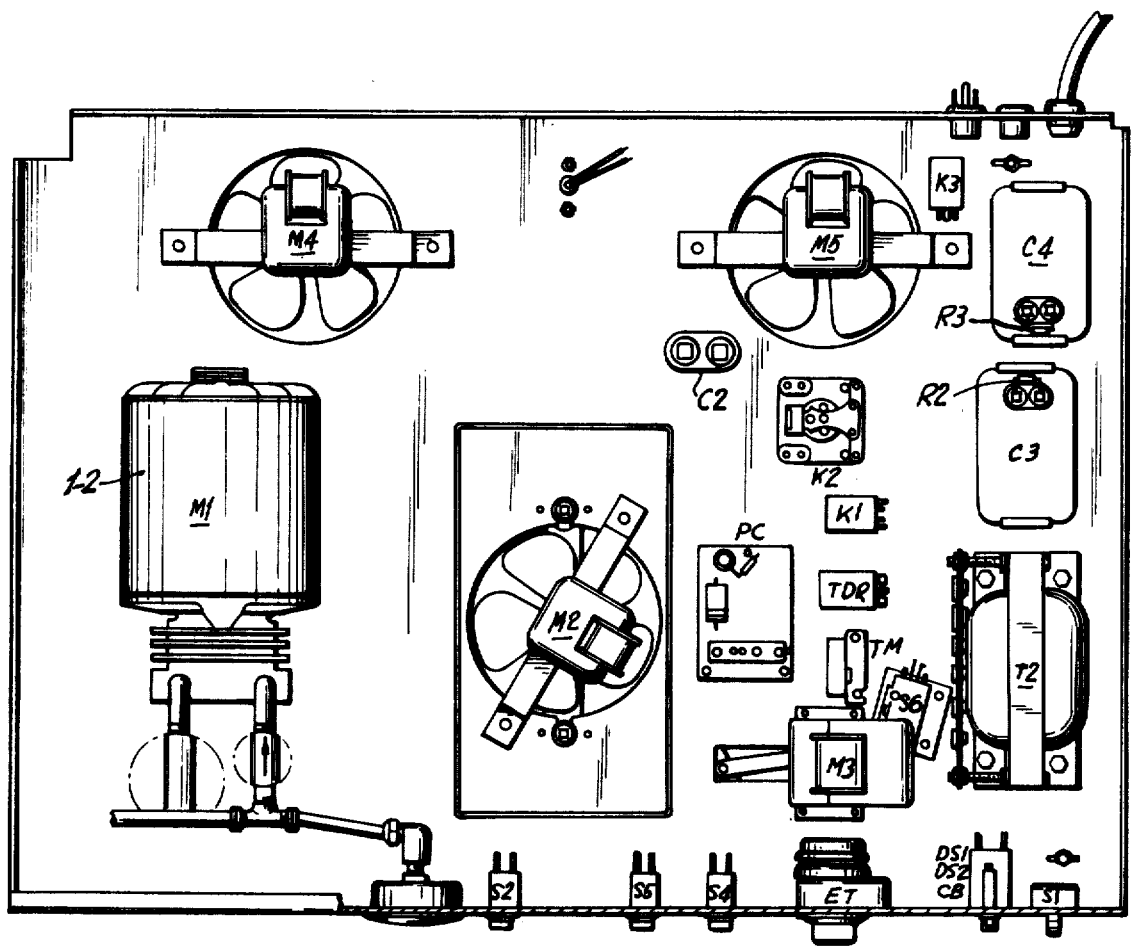
FIG. 2 is a plan view of the chassis behind the control panel of FIG. 1.
Figure 2:
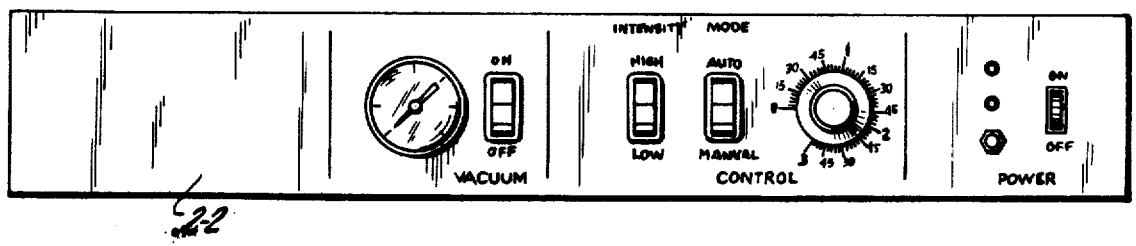
Figure 3:
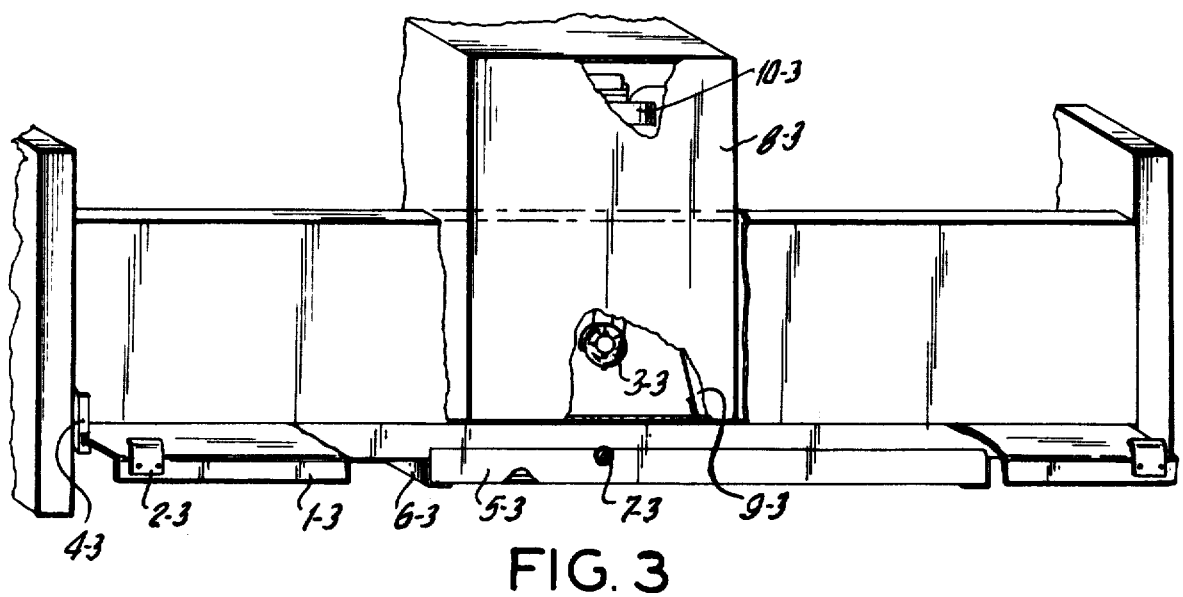
FIG. 3 is a perspective view of the lamp and glass shield installation of the apparatus in FIG. 1.
Figure 4:
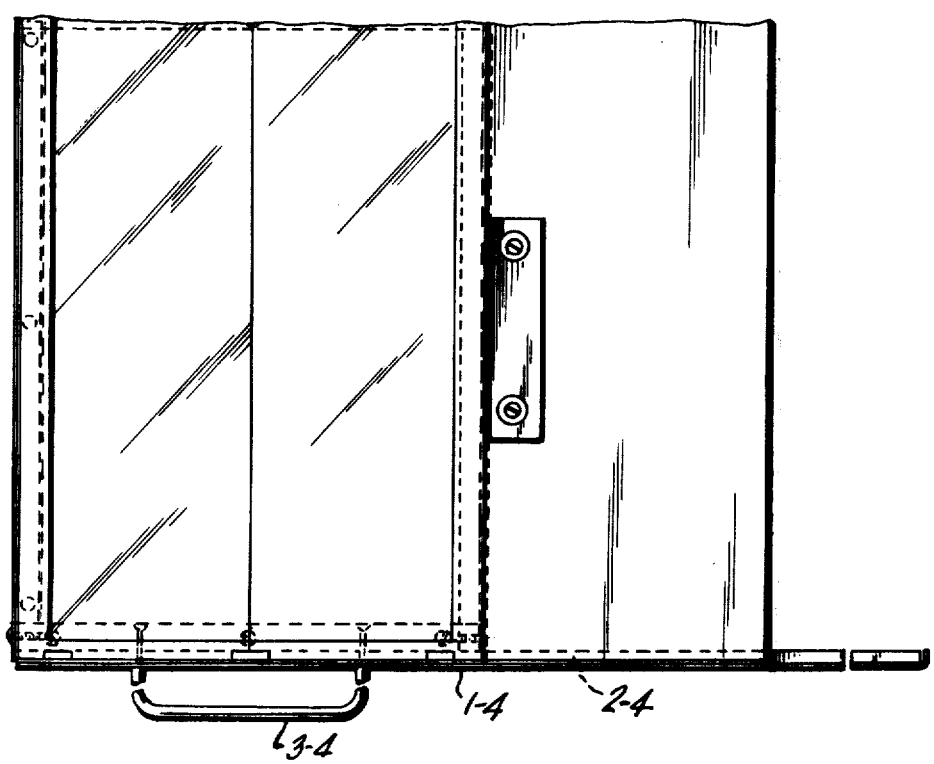
FIG. 4 is an elevation of the window or filter assembly in FIG. 1.

As shown in FIG. 1, the printer is composed of a solid fixed wooden cabinet 3-1, a fixed supporting table 4-1 for the photosensitive material and copy, a pivotable transparent glass plate 5-1, a lifting and latching handle 6-1, a movable light blocking panel 7-1, a pivotable panel 1-2, a control panel and chassis 8-1, a top fixed removable panel 9-1, a removable perforated cover 10-1 and two sliding latches 21-1.

Two side panels and a back panel support the table 4-1 and chassis 8-1 and together form part of the structure of the cabinet 3-1. On the table 4-1 is mounted on soft flexible rubber vacuum blanket 12-1. Also mounted to the table is a transparent glass plate 5-1 which is hinged at the rear of the table. In the lower position of the glass plate i.e. horizontal, the four edges of the rubber blanket and the glass make contact.

A vacuum pump 1-2 shown in FIG. 6 is mounted on the chassis 2-2 and has a hose connected to the vacuum blanket 12-1. A vacuum can thus be created between the plate 5-1 and blanket 12-1. In the upper position of the glass plate the photosensitive material and copy may be inserted or removed from the rubber blanket. The transparent glass plate 5-1 is mounted in a frame which is spring loaded upwardly and which includes a handle 6-1 on its front portion. A bar 14-1 with two latches 13-1 is pivotably attached to the handle. The latches 13-1 lock with rollers 16-1 mounted on the table 4-1 when the glass plate is in the lower position. The glass plate may be released to move upward by placing a hand or hands on the handle 6-1 and drawing the bar 14-1 towards the handle.

The light blocking or filter panel 7-1 closes the front of the cabinet 3-1 to prevent rays from the printing light from reaching the operator. Suitable means shown in FIGS. 6 and 6A move the light blocking panel 7-1 as the 5-1 transparent plate is swung upwardly to insert or to remove the photosensitive material and copy. The light blocking panel 7-1 is partially opaque to actinic rays and formed with triangular side members. The light blocking panel 7-1 is attached to the front end of the transparent glass plate 5-1 by means of pins 17-1 extending from the transparent plate into an opening of the sliding latch 11-1 which is a part of the side member of the light blocking panel. The upper end of the light blocking panel is slidably mounted in guideways 15-1 and arranged so that when the operating handle 6-1 is raised upwardly to lift the transparent plate 5-1, the light blocking panel 7-1 slides into the cabinet in prearranged path along the guideways 15-1. The light blocking panel 7-1 can be easily detached from the transparent plate by moving the sliding latches 11-1 and unlocking them from the pins 17-1 on the transparent plate. The panel can now be independently removed from the printer or can be stored inside the cabinet by hanging the light blocking panel on two small plates 2-3 extending from the lower panel 1-3. The removal or storage of the light panel permits easier cleaning of the transparent plate, accurate inspection of the location of the photosensitive material to the positive, accurate inspection of, if any, trapped air bubbles between the glass plate, the positive and photosensitive material on nulling vacuum and access for changing the printing lamp 3-3. As mentioned earlier, the latter is positioned overhead at an optimum distance from the vacuum frame.

A pyrex glass frame assembly 5-3 is placed beneath the printing lamp to prevent heat build-up in the cabinet. The pyrex frame assembly may be removed by unscrewing a knob 7-3 and sliding the frame assembly towards the operator. Removal of the pyrex frame assembly provides access to the printing lamp.

An ultra-violet filter 1-4 for use with special photosensitive materials is provided as an accessory. This filter is mounted beneath a special pyrex frame assembly 2-4. The U.V. filter may be stored on the pyrex frame assembly by grasping the U.V. filter handle 3-4 and sliding the filter to the extreme right hand position when not in use.

The lamphouse assembly 8-3 is a composite unit incorporating a lamp 3-3, reflector 9-3 and cooling fan 10-3. The housing 8-3 is designed to exhaust hot air from the printer, and is positioned above the vacuum frame.

The control panel and chassis 2-2 is built to accept the majority of the electronic components, the vacuum pump 1-2, the shutter mechanism, the lamphouse assembly 3-2 and fan-motors 4-2 to blow cool air into the cabinet. A top panel 9-1 is easily removable for servicing of the vacuum pump. Removal of the cover 10-1 gives easy access to components on the chassis. The shutter 1-5 has two positions, i.e. closed and open. In its closed position the shutter blocks light from the printing lamp reaching the transparent plate. In the open position photosensitive materials may be exposed. The shutter is connected by a link 2-5 and a lever 3-5 to a cam 4-5 on a motor 5-5. Steps on the cam operate a microswitch 6-5 which cuts off the power to the conebrake electric motor 5-5 thus determining the position of the shutter. The shutter is mounted on two shafts 7-5 and slides along these shafts in a linear motion.

In FIG. 6 a slidable latch 11-1 sliding on the side panel 63 of the viewing filter or light blocking panel 7-1 latches the panel to the transparent plate 5-1. The latter overlies the blanket 12-1 and pivots about a pin 71. The side panel 63 is secured to the panel 5-1. A pin 73 at the edge of the panel 7-1 slides in a guide 15-1 from the position shown in FIG. 6 to that shown in FIG. 6'. The handle 14-1 facilitates upward movement. The panel 7-1 can be moved up independently of the plate 5-1 by moving the latch 11-1 to the right so that plate 5-1 remains horizontal and panel 7-1 goes up. The entire operation occurs within the cabinet.

What is claimed is:

1. A printer for use in exposing photosensitive material comprising a base, a transparent plate substantially covering the base, means pivotally mounting the transparent plate above the base to receive photosensitive material and copy therebetween, a source of printing light mounted above the transparent plate and directed towards the transparent plate, a cabinet including said base and projecting upwardly from said base and surrounding said transparent plate, said cabinet holding said source, said cabinet having a panel at least partially opaque to rays closing the front of the cabinet above the transparent plate and movable therewith, guideway means on the cabinet for slidable movement of the viewing panel as it is raised and lowered with the transparent plate as the plate is swung upwardly and downwardly to provide space so as to insert or remove the photosensitive material and the copy from between the plate and the base, said guideway means including guide means for guiding the top of the viewing panel horizontally as the viewing panel is moved upwardly to cause the viewing panel to rest horizontally within the cabinet when it is lifted.

2. An apparatus as in claim 1, wherein said guide means includes runners extending substantially horizontal within the cabinet and a pair of projections projecting outwardly from said viewing panel and into said runners, said projections and said runners being movable relative to each other.

3. A printer as in claim 1, wherein said cabinet includes latching means coupling and uncoupling said panel to and from said plate, so that said plate is moved with said panel when the latching means couples the plate to said panel and so that the panel moves without said plate when said latching means uncouples said panel from said plate.

4. An apparatus as in claim 1, wherein an exposure unit is combined with the light source and controls within the cabinet.

5. An apparatus as in claim 1, wherein vacuum forming means are mounted within the cabinet for evacuating the cabinet when the viewing panel is lowered.

6. A printer for use in exposing photosensitive material, comprising a flat member forming a base, a transparent plate substantially covering the base, means pivotally mounting the transparent plate for articulating movement of the plate from the base, a cabinet including said base and projecting upwardly from said base and surrounding the transparent plate, said cabinet having a panel at least partially opaque to electromagnetic rays closing the front of the cabinet above the transparent plate and movable with said plate, support means on the cabinet for guidance of the panel as said panel is raised and lowered with the transparent plate said support means including guide means for guiding the top of the panel horizontally as the panel is moved upwardly to cause the panel to rest horizontally within the cabinet when it is lifted.

7. An apparatus as in claim 6, wherein said light source includes a mechanical shutter for opening and closing the light path between the source and the transparent plate.

8. An apparatus as in claim 6, wherein said light source includes a shutter for turning the light on and off electrically.

9. An apparatus as in claim 6, wherein said light source includes a lamp, and electrical means for varying the maximum intensity of the lamp during each exposure.

10. An apparatus as in claim 6, wherein said light source includes a lamp and a shutter for varying the maximum light to strike the transparent plate during each exposure.

11. An apparatus as in claim 6, wherein cooling means cool the light source and the interior of the cabinet.

12. An apparatus as in claim 6, wherein said guide means includes means for counterbalancing the weight of at least the viewing panel so that the viewing panel can be lowered and raised easily.

13. An apparatus as in claim 6, wherein said guide means includes runners extending substantially horizontally within the cabinet and a pair of projections projecting outwardly from the panel and into said runners, said projections and said runners being movable relative to each other.

14. A printer as in claim 12, wherein said cabinet includes latching means coupling and uncoupling said panel to and from said plate, so that said plate is moved with said panel when the latching means couples the plate to said panel and so that the panel moves without said plate when said latching means uncouples said panel from said plate.

15. A printer as in claim 14, wherein said panel includes side sections, said cabinet having side walls, said side sections being substantially parallel with said side walls, said side sections including a portion of said latching means.

16. An apparatus as in claim 6, wherein said guide means include means for removal of the viewing panel.

* * * * *